Sept. 6, 1966  F. BASTOW  3,271,038
SEALING DEVICES
Filed Oct. 29, 1963
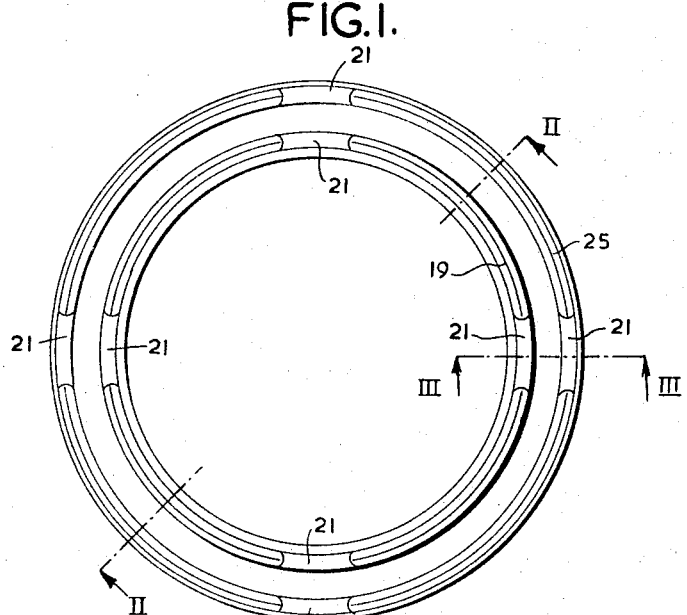
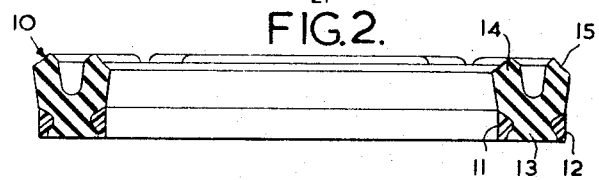
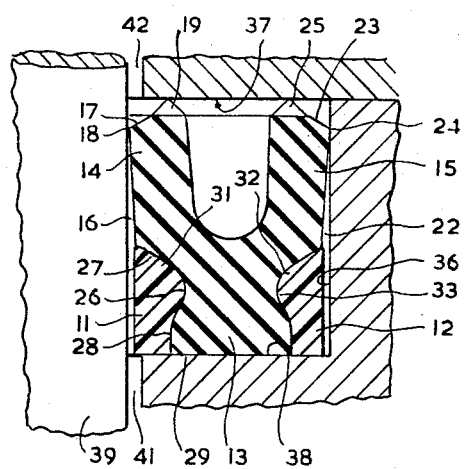
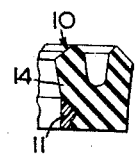
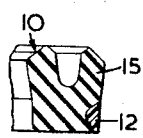
INVENTOR
FRANK BASTOW
BY Reynolds & Christensen
ATTORNEYS United States Patent Office 3,271,038
Patented Sept. 6, 1966

3,271,038
SEALING DEVICES
Frank Bastow, Charlton Kings, Cheltenham, England, assignor to Dowty Seals Limited, Ashchurch, near Tewkesbury, England, a British company
Filed Oct. 29, 1963, Ser. No. 319,785
Claims priority, application Great Britain, Oct. 30, 1962, 41,049/62
2 Claims. (Cl. 277—205)

This invention relates to sealing devices for providing a fluid tight seal between relatively movable members which have co-axial sealing surfaces. In particular, the invention provides a sealing device suitable for use as a piston seal or a shaft seal subject to high working pressure. In such high pressure uses, a sealing ring of rubber, synthetic rubber or other elastomeric material is often provided with a backing ring of flexible but harder material such as nylon to separate the sealing ring from the working clearance between the relatively movable members, whereby the softer material of the sealing ring cannot be extruded into this working clearance by high fluid pressure. Such a backing ring, being a different material from that of the sealing ring, is made separate and eventually assembled with the sealing ring in the required installation.

According to the invention, a sealing device for use between relatively movable members which have co-axial sealing surfaces, comprises a sealing ring of resiliently deformable material shaped to be capable of providing a static seal against the sealing surface of one member in which it is mounted and a dynamic seal against the sealing surface of the other member, and a backing ring of a flexible material harder than that of the sealing ring arranged at the base of the sealing ring in a position to bridge over the working clearance between the members, the sealing ring and the backing ring having complemental surfaces shaped to provide releasable locating engagement of one ring radially within the other.

A sealing device in accordance with the invention is illustrated in the accompanying drawings of which, FIGURE 1 is a plan view, FIGURE 2 is a sectional view on the line II—II of FIGURE 1, FIGURE 3 is an enlarged sectional view on the line III—III showing the sealing device arranged as a shaft seal, FIGURE 4 is a sectional view of a modified sealing device having an internal backing ring only, and FIGURE 5 shows another modification in which the sealing device has an external backing ring only.

The device comprises a sealing ring 10 of rubber, synthetic rubber or other resiliently deformable material and two backing rings 11 and 12 of a flexible but harder material such as nylon. In the example illustrated the sealing device is constructed for use either as a piston seal or as a shaft seal and its form in section is accordingly symmetrical about a bisecting axis parallel to the central axis of the device. The sealing ring comprises a base portion 13 having two somewhat diverging lips 14 and 15 extending therefrom. The radially inner lip 14 has an outer surface 16 and a chamfered end surface 17 both of which intersect at a sealing edge 18, the angle included between the surfaces 16 and 17 being somewhat greater than a right angle. Adjacent the chamfered end surface 17, the lip 14 is formed with an annular projection 19 of triangular form whose apex angle is substantially 90°. This annular projection 19, which is spaced radially and axially from the sealing edge, is divided into four sectors by the provision of radial gaps 21.

The radially outer lip 15 comprises in cross-section the mirror opposite of the lip 14 and accordingly includes an outer face 22, a chamfered end face 23, a sealing edge 24 at the intersection of the faces 22 and 23 and an annular projection 25 which is divided into four sectors by radial gaps 21.

The base portion 13 of the sealing ring 10 is set back radially from the face 16 by an annular recess 26 which receives the backing ring 11. The annular recess 26 has a portion of arcuate contour forming a groove which on one side leads into a frusto-conical surface 27 terminating at the outer face 16 and which on its other side leads into a cylindrical surface 28 terminating at the transverse end face 29 of the base 13. The maximum diameter of the recess 26 is greater than the diameter of the cylindrical surface 28 in order to provide for interlocking location of the backing ring 11 when fitted to the sealing ring 10.

The backing ring 11 has a cross-section similar to that of the recess 26 and it accordingly has an outward radial annular bead or flange 31 capable of complemental and interlocking engagement with the arcuate portion of the recess 26. The outer surfaces of the backing ring 11 are substantially contiguous with the outer surface 16 and the transverse end face 29 respectively.

The backing ring 12 has a cross-section which is the mirror opposite of the backing ring 11 and it accordingly has an inward radial projection or flange 32 capable of interlocking with the arcuate portion of a recess 33 formed on the other side of the base 13 from the recess 26. The sealing ring 10 and the backing rings 11 and 12 are moulded separately and afterwards fitted together. The profiles of the recesses 26 and 33 in the ring 10 and the corresponding profiles of the backing ring flanges 31 and 32 are chosen so that the backing rings 11 and 12 can be readily snapped on to the resilient material of the sealing ring 10 and yet be sufficiently firmly retained thereon to prevent accidental separation.

An alternative manner of construction is to provide a mould with rectangular corners at the base of the mould cavity to receive the backing rings 11 and 12 so that the sealing ring 10 can be moulded onto the backing rings 11 and 12.

In the installation shown diagrammatically in FIGURE 3 the member in which the sealing device is mounted has a rectangular section annular housing cavity having an outer wall 36 (outer in the radial sense, but as shown actually the bottom of the cavity) and axially spaced end walls 37 and 38. The movable member comprises a shaft 39 extending through the housing and having a radial clearance 41 from the end wall 38 which is partially bridged over by the backing ring 11. The dimensions of the housing cavity are chosen so that the base 13 with the backing rings 11 and 12 are an easy fit in the housing cavity. The previously divergent lips 14 and 15 are flexed towards each other upon entering the housing cavity and they bear respectively against the shaft 39 to provide a dynamic seal at 18 and against the wall 36 to provide a static seal at 24. The annular projection 19 on the dynamic sealing lip 14 may lie just touching or slightly compressed against the end wall 37 of the housing, when the end face 29 seats upon the opposite end wall of the cavity, and its function is to resist drag forces on the lip 14 caused by axial movement of the shaft 39 in the upward direction of FIGURE 3. Such drag forces have been known to roll some previously known types of lipped sealing ring out of the correct working position within the ring housing. So that the annular projection 19 may not establish a continuous seal against the end wall 37, the radial gaps 21 are provided to maintain fluid pressure access to the space between the lips 14 and 15. In a piston and cylinder device, for example, in which the shaft 39 forms a piston rod, fluid pressure acting to move the piston and piston rod 39 in the upward direction of FIGURE 3 will also act through the clearance 42 between the shaft 39 and the end wall 37 and within the space formed between the two lips 14 and 15, urging the latter inwardly and outwardly, respectively.

The compression of the base material under such urging of fluid pressure contracts the backing ring 11 on to the shaft 39 to bridge over fully the working clearance 41.

When the sealing device is mounted to act as a piston seal, the backing ring 12 will be required to bridge over the clearance between the cylinder and the piston slidable therein and it will be readily understood that the action of fluid pressure upon the base material of the sealing ring 10 will similarly expand the backing ring 12 to take up the easy fitting clearance and bear firmly against the cylinder wall. Moreover in such an installation the annular projection 25 on the outer lip 15 will act against the adjacent surface of the seal housing to break any initial adhesion between the lip 15 and the cylinder wall and thus resist any tendency for such adhesion forces to roll the sealing ring 10 out of its correct working position within the housing.

In the example described with reference to FIGURES 1, 2 and 3 it should be understood that the provision of two backing rings 11 and 12 is to enable the sealing device to be used without modification either to seal internally against a shaft or to seal externally against a cylinder, and that in either application only one of the backing rings serves to prevent extrusion of the sealing ring 10 into the working clearance. If the sealing device must seal only internally, or only externally, its form may be appropriately modified.

FIGURE 4 shows the cross-section of a modified sealing device having an internal backing ring 11 only, and being suitable for providing a dynamic seal with the internal lip 14 against a shaft or the like.

FIGURE 5 shows the cross-section of another sealing device having an external backing ring 12 only, and being suitable for providing a dynamic seal with the external lip 15 against cylinder bore or the like.

I claim as my invention:

1. A sealing device for use between relatively movable members which have co-axial sealing surfaces, comprising a sealing ring of resiliently deformable material having a base portion defined in part by an end face transverse to the central axis of the ring, inner and outer sealing lips extending from the base portion on opposite sides thereof so as to be capable of effecting sealing engagement with the respective co-axial sealing surfaces when the sealing device is interposed therebetween, an annular recess formed in the angle of the sealing ring which is defined by the intersection of the transverse end face and the outer face of that sealing lip which has a sealing edge that in use is engageable with the relatively movable member, a backing ring of a flexible material harder than that of the sealing ring having a surface complemental to the surface of the recess, said complemental surfaces being shaped to provide on one of said rings an annular groove and on the other of said rings an annular bead, whereby the sealing ring and the backing ring may enter into releasable locating engagement of one ring radially within the other and an annular projection in the axial direction beyond the sealing edge of at least that sealing lip which engages the relatively movable member, said annular projection being set back in a radial sense from the sealing edge, and said annular projection having a radial gap therein for providing communication for pressure fluid across the end of the lip when the sealing device is mounted in a housing.

2. A sealing device for installation within a groove in one of two relatively movable members, comprising a sealing ring of resiliently deformable material having a base portion defined in part by an end face transverse to the central axis of the ring, which end face in use seats at one side of the groove, outer and inner sealing lips separated by an annular groove and extending from the base portion towards, and each formed with a sealing lip that is arranged in use to effect sealing engagement with, the bottom of the groove and the coaxial sealing surface of the relatively movable member, respectively, the angle between the transverse sealing face and the inner lip being formed with an annular recess, a backing ring of flexible material harder than the material of the sealing ring, said backing ring having a surface complemental to that of the sealing ring's annular recess, said complemental surfaces being shaped to provide on one of said rings an annular groove and on the other of said rings an annular bead, in releasably interlocking engagement to locate one ring radially and axially with relation to the other, and an annular projection in the axial direction beyond the sealing edge of the inner sealing lip, said annular projection being set back in the radial sense from its sealing edge, and being of an axial extent to engage the side of the groove opposite the side whereon the end face of the base portion seats, and said annular projection being interrupted to provide for communication of pressure fluid across the inner lip to the interior of the annular groove that separates the sealing lips.

References Cited by the Examiner

UNITED STATES PATENTS 2,964,366 12/1960 Reynolds _____ 277—205 X
3,009,721 11/1961 Newton _____ 277—205 X

FOREIGN PATENTS 1,046,966 12/1958 Germany.
797,684 7/1958 Great Britain.
848,590 9/1960 Great Britain.
907,542 10/1962 Great Britain.

LEVERNE D. GEIGER, *Primary Examiner.*

EDWARD V. BENHAM, *Examiner.*

J. MEDNICK, *Assistant Examiner.*